UNITED STATES PATENT OFFICE.

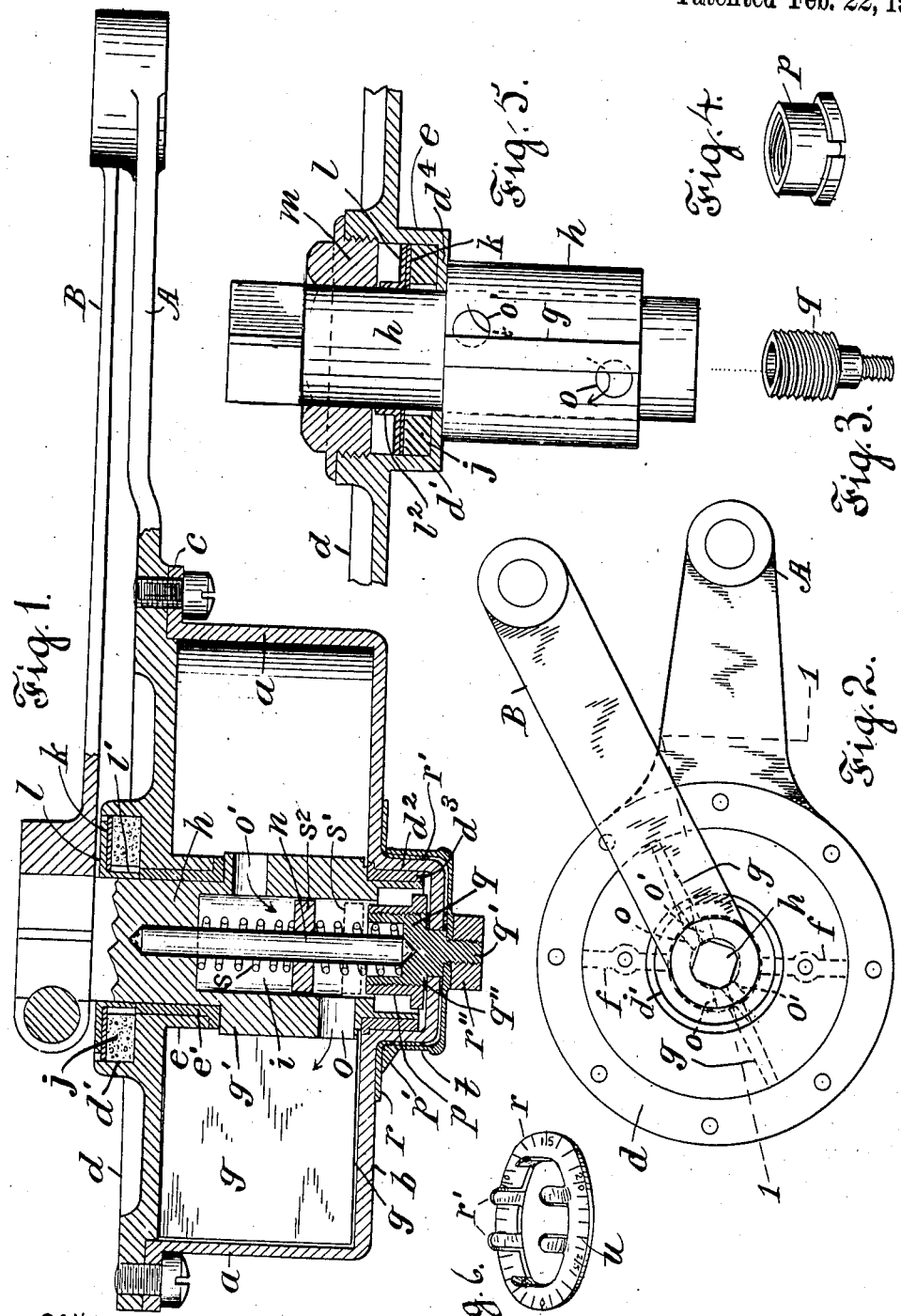

ADOLPH J. PETELER, OF YONKERS, NEW YORK, ASSIGNOR TO JOHN F. McGUIRE, OF NEW YORK, N. Y.

VEHICLE SHOCK-ABSORBER.

1,172,387.

Specification of Letters Patent. Patented Feb. 22, 1916.

Application filed January 13, 1915. Serial No. 1,968.

*To all whom it may concern:*

Be it known that I, ADOLPH J. PETELER, a citizen of the United States, residing at 452 Van Cortland Park avenue, Yonkers, county of Westchester, State of New York, have invented certain new and useful Improvements in Vehicle Shock-Absorbers, fully described and represented in the following specification and the accompanying drawings, forming a part of the same.

The present invention relates to a shock-absorber having two arms jointed together, one being attached to the chassis of a vehicle the body of which is carried by vehicle springs, and the other arm attached to such body and the movement of the arms opposed by fluid contained in the cylindrical casing of the absorber, as in the construction of my Patent No. 1,057,452 granted February 18, 1913.

It is especially desirable that shock-absorbers should control the upward movements of the vehicle-body which occur in its reaction whenever the springs supporting the body have been compressed by a sudden jolt of the chassis, and the construction described in the said patent required a spindle perforated from one end to the other with a diaphragm in its bore and a piston having a piston-rod and a spring inserted in the bore from the outer end, which bore required to be closed by a fluid-tight plug upon the outer end of the spindle.

Heretofore, the spindle of the shock-absorber required, where it passed through the head or cover of the casing, a stuffing-box with a screw-gland to compress a yielding packing therein, and one object of the present invention is to wholly avoid the use of any screw-gland or any adjustable or movable fixture for making the packing tight; and this object is attained by a packing of particular construction fitted to a packing-socket upon the head or cover of the casing, and a collar secured upon the spindle itself to bear upon such packing, which is thus held between the collar and the bottom of the socket.

Another object of the invention is to secure the same range of regulation that was afforded by the prior construction, and with a reduced number of parts and a spindle requiring a bore in its inner end only, thus avoiding the necessity of plugging the outer end.

The new construction embodies a spindle with a bore in its inner end only, with an annular piston movable in such bore, ports extended into the bore from opposite sides of each wing at different points in the length of the bore, and a rod fixed in the center of the bore to guide the piston and to support spiral springs which press upon opposite sides of the piston and hold it normally between the two ports. The construction also employs a screw-regulator to vary the movement of the piston in the manner described in the said patent.

The invention will be understood by reference to the anexed drawing, in which—

Figure 1 is a section on line 1—1 in Fig. 2; Fig. 2 is a plan of the shock-absorber upon a smaller scale than Fig. 1; Fig. 3 is a perspective view of the regulator-screw; Fig. 4 is a perspective view of the regulator-block; and Fig. 5 shows in section an alternative arrangement for the packing in the stuffing-box. Fig. 6 is a perspective view of the dial.

$a$ designates the periphery of a cylindrical casing, with head $b$ at one end and flange $c$ at the opposite end to which is secured a cover $d$ containing a packing-socket $d'$. A bearing-socket $d^2$ is formed upon the center of the bottom head and provided with a bushing $d^3$ to form a bearing for the inner end of the spindle, and the cover $d$ is formed with an inwardly projecting hub $e$ lined with a removable bushing $e'$ which forms an extended and renewable bearing for the spindle at the bottom of the packing-socket. Fixed abutments $f$ are shown in Fig. 2, and wings $g$ formed integral with the spindle $h$, the inner end of which is formed with a cylindrical bore $i$. Ports $o$ and $o'$ are extended into the bore from opposite sides of each wing, the port $o$ being close to the head $b$ and the port $o'$ close to the hub $e$. The packing at the neck of the spindle is formed of a ring $j$ of comparatively soft or yielding material, as cork or india-rubber, which is fitted tightly to the bore of the packing-recess. Upon the outer face of this elastic ring is arranged a washer $k$ of harder but also yielding material, as vulcanized fiber, adapted to make a joint with a collar $l$ fitted tightly to the neck of the spindle.

Where the abutments $g$, as shown in the drawing, are made integral with the spindle, such collar must be made separate from the spindle to apply it after the spindle has been projected through the hub $e$ and the packing-socket, and the collar is shown in the drawing formed with a flange $l$ to bear upon the outer side of the washer $k$ and with a hub $l'$ to fit tightly upon the spindle, upon which it is pressed by suitable means with tightness enough to prevent any leakage. Such collar is pressed upon the spindle while the ends of the wings $g$ rest against the inner end of the bushing $e'$, as shown in Fig. 1, and the collar is crowded with sufficient force upon the washer $k$ to compress the elastic ring $j$ and produce a tight joint between the collar and the washer. The elasticity of the ring $j$ maintains the closeness of such joint permanently, there being no wear upon the inside of the ring as it is made to clear the hub $l'$, and none upon its outer side where protected by the washer. An arm A is shown attached to the cover, and an arm B fastened upon the spindle, by which arms the absorber may be connected with the chassis and body of the vehicle.

Oil is commonly used as the fluid medium within the casing $a$, and with the construction shown the oil may penetrate within the bearing $e'$ and thus lubricate the spindle efficiently, but not extending past the collar $l$ which forms a tight joint with the packing in the recess $d'$.

With the construction shown in Fig. 1, the packing-recess may be very shallow, and the bearing $e'$ may be quite long, thus affording much gearter support to the spindle where it passes through the cover $d$; but an alternative construction is shown in Fig. 5 where the hub $l^2$ of the flange $l$ is turned outwardly, and a threaded collar $m$ is screwed into the outer end of the packing-recess to form a bearing on the cover $d$. The screw-collar $m$ furnishes a partial bearing for the spindle, but crowds the elements of the packing farther inside of the cover $d$ and reduces the bearing-portion of the cover to the thin flange $d^4$ shown at the bottom of the packing-recess $d'$ in Fig. 5. The construction shown in Fig. 1 is preferred, as affording a long bearing with a renewable bushing $e'$ in the hub $e$ of the cover. In the present modification of the spring-piston, a rod $n$ is fixed in the center of the bore $i$ of the spindle, and an annular piston $s^2$ is fitted to move loosely upon the rod and in the bore. Spiral-springs $s$ are fitted to the rod $n$ at opposite sides of the piston, one of them bearing against a regulator-screw, which is provided, as stated in my prior patent, to move a regulator-block $p$ within the end of the bore, to limit the movement of the piston $s^2$. The regulator-block $p$ is shown in perspective in Fig. 4 and is held from turning by any suitable means, so that when the regulator-screw is turned it moves the regulator-block to or from the piston $s^2$, and limits the movement by which the piston can move downward past the port $o$. The piston is shown in dotted lines at $s'$ moved downward to almost wholly open the said port, thus permitting a free passage of fluid through the ports $o$ and $o'$, and causing the liquid to oppose little resistance to the movement of the wings. The annular piston in the present construction thus operates the same as that in my prior patent, but omitting many complicated features of construction. The bearing-socket $d^2$ projects outside of the head $b$, and a disk-shaped dial $r$, shown separately in Fig. 6, is fitted upon the head around the bearing-socket and formed with elastic tongues $r'$ which grip the outer side of the socket elastically, and thus hold the dial in place while permitting it to be turned upon the socket when desired. The screw has a shank $q'$ extended through the bottom of the bearing-socket with a packing-washer $q''$ to prevent leakage. A nut $r''$ is secured upon the shank and an index $t$ is secured to the shank by the nut, and is preferably made of cup-form in such proportions as to inclose or cover the bearing-socket and the tongues $r'$ upon the dial, such cup being also adapted to turn around the bearing-socket when the regulating-screw is adjusted by the nut $r''$. A pointer $p'$ is fixed upon the index to move in proximity to the dial, upon which suitable graduations $u$ are provided to indicate the setting of the regulator-screw. The movability of the dial permits the zero of the scale to be set at any desired point from which the movement of the pointer $p'$ may be reckoned, thus showing the shifting of the regulator-screw from any given point.

The constructive features shown herein offer a material advantage over my prior construction, as the bearings are all self-lubricating, the construction is simplified, and the dial is rendered adjustable.

Having thus set forth the nature of the invention what is claimed herein is:

1. A shock-absorber having a cylindrical casing with packing-socket upon the top, abutments fixed within the casing, a spindle having wings movable between the abutments and extended outward through the packing-socket, a yielding packing in the bottom of the socket, a wearing washer of yielding material upon the top of the packing, and a collar upon the spindle fitted to rest upon such washer to make a tight joint therewith.

2. A shock-absorber having a cylindrical casing with a removable cover having a packing-socket in the center, abutments fixed within the casing, a spindle having wings movable between the abutments and the spindle extended outwardly through the packing-socket, a yielding packing in the bottom of the socket, a wearing-washer of yielding material upon the top of such packing, and a collar made separate from the spindle and fitted tightly to the spindle in contact with the said washer, thus holding the cover between the said collar and wings.

3. A shock-absorber having a cylindrical casing with a removable cover having a packing-socket in the center, abutments fixed within the casing, a spindle having wings integral therewith movable between the abutments, and the spindle extended outwardly therefrom, a yielding packing in the bottom of the socket, a wearing-washer of yielding material upon the top of such packing, and a collar having a hub forced tightly upon the spindle and a flange fitted to contact with the wearing-washer, thus holding the cover between the said flange and the integral wings.

4. In a shock-absorber, the combination, with a cylindrical casing having a packing socket upon the top, of abutments fixed within the casing, a spindle having wings movable between the abutments and extended outward through the packing-socket, a packing fitted to the socket and the said spindle, the spindle being hollow at its inner end with ports extended into its bore from opposite sides of each wing, said ports being at different points in the length of the spindle, an annular piston movable within the bore between the two ports, a rod fixed in the center of the bore to guide the pistons, and spiral-springs operating upon opposite sides of the piston to hold it normally between the ports, and yielding under the pressure of the liquid forced through the ports by the movement of the wings toward the abutments.

5. A shock-absorber having a cylindrical casing with a packing-socket upon the top and a bushed bearing at the bottom of the socket, abutments fixed within the casing, a spindle having wings movable between the abutments and extended outward through the bearing and the packing-socket, a yielding packing in the bottom of the socket next the bearing, and a collar upon the spindle fitted to rest upon such packing to make a tight joint therewith, whereby the fluid in the casing is enabled to lubricate the bearing at all times.

6. In a shock-absorber having a cylindrical casing with wings movable between abutments, and having a bearing-socket upon one head and the shank of a regulating-screw projecting through such bearing-socket, the combination, with such socket and shank, of a dial-plate fitted around the bearing-socket with tongues gripping the socket elastically to permit a movement of the dial-plate when required, and a cup-shaped index carried by the shank and inclosing the bearing-socket and the said tongues, and having a pointer to indicate upon the dial-plate the setting of the regulator-screw.

7. A shock-absorber having a cylindrical casing with a bearing-socket upon one head, abutments fixed in the casing, a spindle having wings between the abutments, and extending into the bearing-socket, and provided with a bore and a piston movable therein, a regulator-block movable in the bearing-socket and extending into the said bore, springs in the bore upon opposite sides of the piston, a regulator-screw fitted to the block with a shank extended through the bearing-socket, a dial-plate fitted around the bearing-socket with tongues gripping the socket elastically, and the said shank having an index fitted to move outside of the said tongues with a pointer to indicate upon the dial-plate the setting of the regulator-screw.

In testimony whereof I have hereunto set my hand in the presence of two subscribing witnesses.

ADOLPH J. PETELER.

Witnesses:
FREDERICK D. LYON,
E. W. ELVERSON.